(12) United States Patent
Watanabe

(10) Patent No.: US 12,399,662 B2
(45) Date of Patent: Aug. 26, 2025

(54) INFORMATION PROCESSING APPARATUS, INFORMATION PROCESSING METHOD, AND NON-TRANSITORY COMPUTER READABLE MEDIUM FOR REGISTERING POSITIONAL INFORMATION OF IMAGE FORMING APPARATUS CONTROLLED AS VIRTUAL PRINTER BY SERVER

(71) Applicant: FUJIFILM Business Innovation Corp., Tokyo (JP)

(72) Inventor: Tsuyoshi Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 433 days.

(21) Appl. No.: 17/705,368

(22) Filed: Mar. 27, 2022

(65) Prior Publication Data

US 2023/0065200 A1 Mar. 2, 2023

(30) Foreign Application Priority Data

Aug. 31, 2021 (JP) ................ 2021-140961

(51) Int. Cl.
*G06F 3/12* (2006.01)

(52) U.S. Cl.
CPC .......... *G06F 3/1224* (2013.01); *G06F 3/1204* (2013.01); *G06F 3/1236* (2013.01);
(Continued)

(58) Field of Classification Search
CPC .... G06F 3/1224; G06F 3/1204; G06F 3/1236; G06F 3/1288; G06F 3/1292;
(Continued)

(56) References Cited

U.S. PATENT DOCUMENTS

| 9,229,666 B2 | 1/2016 | Oguma et al. |
| 2017/0262739 A1* | 9/2017 | Lehotsky ............... H04L 67/10 |

(Continued)

FOREIGN PATENT DOCUMENTS

| CA | 2947250 | 9/2017 |
| JP | 2015005195 | 1/2015 |

(Continued)

OTHER PUBLICATIONS

"Notice of Reasons for Refusal of Japan Counterpart Application", issued on Mar. 25, 2025, with English translation thereof, pp. 1-8.

*Primary Examiner* — Kent Yip
(74) *Attorney, Agent, or Firm* — JCIPRNET

(57) ABSTRACT

An information processing apparatus includes a processor configured to: acquire apparatus identification information of an image forming apparatus located within a predetermined distance from the information processing apparatus; and transmit to a predetermined destination for a printing service the apparatus identification information that has been acquired and positional information indicating a position of the information processing apparatus after associating the positional information with the apparatus identification information. The image forming apparatus is controlled as a virtual printer corresponding to the image forming apparatus by a server for the printing service, and the server is connected to the image forming apparatus by using a network.

20 Claims, 8 Drawing Sheets

(52) U.S. Cl.
CPC .......... *G06F 3/1253* (2013.01); *G06F 3/1288* (2013.01); *G06F 3/1292* (2013.01)

(58) Field of Classification Search
CPC ......... H04N 1/32776; H04N 2201/006; H04N 2201/0078; H04N 2201/0096
USPC ....................................................... 358/1.15
See application file for complete search history.

(56) References Cited

U.S. PATENT DOCUMENTS

| | | | |
|---|---|---|---|
| 2017/0265027 A1* | 9/2017 | Najari | ................ G06Q 30/0261 |
| 2017/0269885 A1 | 9/2017 | Omori | |
| 2018/0181352 A1* | 6/2018 | Saito | ..................... G06F 3/1288 |
| 2020/0019357 A1 | 1/2020 | Omori | |
| 2021/0240418 A1 | 8/2021 | Saito | |
| 2022/0326896 A1 | 10/2022 | Saito | |

FOREIGN PATENT DOCUMENTS

| | | |
|---|---|---|
| JP | 2017134487 | 8/2017 |
| JP | 2017168046 | 9/2017 |
| JP | 2017168094 | 9/2017 |
| JP | 2021121076 | 8/2021 |

\* cited by examiner

| PRINTER NAME | IDENTIFIER | POSITION | | |
|---|---|---|---|---|
| | | LATITUDE | LONGITUDE | HEIGHT |
| ⋮ | ⋮ | ⋮ | ⋮ | ⋮ |
| D | a6dfc926-2504-4d68-88fc-3bb66b4ebc72 | (UNREGISTERED) | (UNREGISTERED) | (UNREGISTERED) |
| E | 81d943db-5c86-4f1d-91d9-930495de6eac | 35.7 ⋯ | 139.7 ⋯ | 33.6 ⋯ |
| F | eae4594c-c563-4b12-9b36-30bd279d1aff | 34.2 ⋯ | 131.5 ⋯ | 39.9 ⋯ |
| ⋮ | ⋮ | ⋮ | ⋮ | ⋮ |

FIG. 6

Specify printer you want to use in the following list.

Printer Name : E    Position : 35.7 ⋯, 139.7 ⋯

Printer Name : A    Position : 35.7 ⋯, 139.7 ⋯

Printer Name : D    Position : Unregistered

15A

End

FIG. 7

Do you want to register, in database, position of printer D whose position is unregistered?

15B  15C

Register    Do not register

Identifier of this printer is as follows.

5c3e308c-d19d-4a24-b26a-916e7c59092f (two-dimensional code)

INFORMATION PROCESSING APPARATUS, INFORMATION PROCESSING METHOD, AND NON-TRANSITORY COMPUTER READABLE MEDIUM FOR REGISTERING POSITIONAL INFORMATION OF IMAGE FORMING APPARATUS CONTROLLED AS VIRTUAL PRINTER BY SERVER

CROSS-REFERENCE TO RELATED APPLICATIONS

This application is based on and claims priority under 35 USC 119 from Japanese Patent Application No. 2021-140961 filed Aug. 31, 2021.

BACKGROUND

(i) Technical Field

The present disclosure relates to an information processing apparatus, an information processing method, and a non-transitory computer readable medium.

(ii) Related Art

Japanese Unexamined Patent Application Publication No. 2017-134487 discloses an information processing apparatus for providing a method that enables a user operating a mobile terminal to identify a nearby information processing apparatus based on positional information registered in the information processing apparatus by using the mobile terminal. The information processing apparatus is configured to communicate with the mobile terminal and includes an acquiring unit configured to acquire positional information determined by using the mobile terminal and an incorporating unit configured to incorporate the positional information acquired by the acquiring unit as positional information of the information processing apparatus.

Japanese Unexamined Patent Application Publication No. 2015-005195 discloses a device registration system for enabling a device to be easily registered in a search list. The device registration system includes a device, a management server, and a mobile terminal, which are connected to a network. In the device registration system, the device includes a device near field wireless communication unit configured to perform near field wireless communication, the management server includes a registration unit configured to register the device in a search list, and the mobile terminal includes a mobile-terminal near field wireless communication unit configured to perform near field wireless communication. The device registration system registers in the search list the device that is connected to the mobile terminal by near field wireless communication.

SUMMARY

Aspects of non-limiting embodiments of the present disclosure relate to providing an information processing apparatus, an information processing method, and a non-transitory computer readable medium that enable positional information indicating the position of a target image forming apparatus to be registered in a server for a printing service, the server being configured to control the target image forming apparatus as a virtual printer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire apparatus identification information of an image forming apparatus located within a predetermined distance from the information processing apparatus; and transmit to a predetermined destination for a printing service the apparatus identification information that has been acquired and positional information indicating a position of the information processing apparatus after associating the positional information with the apparatus identification information, wherein the image forming apparatus is controlled as a virtual printer corresponding to the image forming apparatus by a server for the printing service and the server is connected to the image forming apparatus by using a network.

BRIEF DESCRIPTION OF THE DRAWINGS

Exemplary embodiments of the present disclosure will be described in detail based on the following figures, wherein:

FIG. 4 is a schematic illustration depicting an example of a configuration of a virtual-printer control information database according to the exemplary embodiments;

FIG. 6 is a front view depicting an example of a printer-availability list screen according to the exemplary embodiment;

FIG. 7 is a front view depicting an example of a registration confirming screen according to the exemplary embodiment;

FIG. 9 is a front view depicting an example of an identifier presentation screen according to an exemplary embodiment.

DETAILED DESCRIPTION

Hereinafter, exemplary embodiments for practicing the present disclosure will be described in detail with reference to the drawings. In the present exemplary embodiments, description will be given with regard to cases where there is provided an information processing system in which geographically distributed multiple physical image forming apparatuses and a cloud-based printing service are included and where the cloud-based printing service controls virtual printers each of which is registered as a virtual apparatus corresponding to one of the multiple physical image forming apparatuses. Examples of the "cloud-based printing service" mentioned herein are represented by the "Universal Print", which is a cloud-based printing service provided by Microsoft Corporation. Using this service, a person who is out of office is able to perform printing by an image forming apparatus via the cloud by using a terminal apparatus that is not allowed to connect to a network in which the image forming apparatus is installed.

First Exemplary Embodiment

Figure 1:
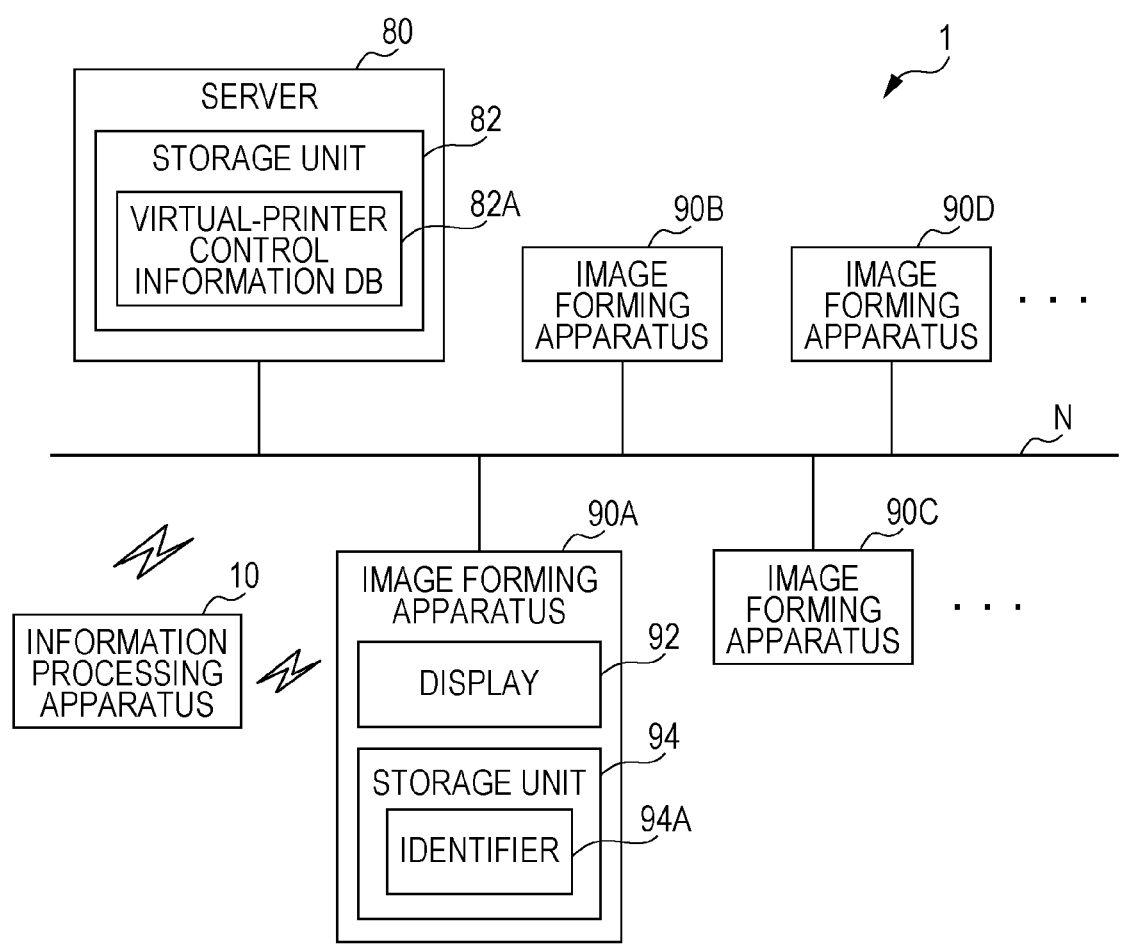
FIG. 1 is a block diagram depicting an example of a configuration of an information processing system according to the exemplary embodiments.

First, referring to FIG. 1, a configuration of an information processing system 1 according to the present exemplary embodiment will be described. FIG. 1 is a block diagram depicting an example of a configuration of the information processing system 1 according to the present exemplary embodiment.

As depicted in FIG. 1, the information processing system 1 according to the present exemplary embodiment includes a server 80 and multiple image forming apparatuses 90A, 90B, . . . , and the server 80 is a cloud server used for a cloud-based printing service. In the following description, each of the image forming apparatuses 90A, 90B, . . . is generally referred to simply as the "image forming apparatus 90" when the image forming apparatuses are not distinguished.

Examples of the server 80 include an information processing apparatus such as a personal computer or a server computer. In the present exemplary embodiment, examples of the image forming apparatus 90 include a digital multi-function peripheral having functions such as an image printing function, an image reading function, and an image transmitting function. However, examples of the image forming apparatus 90 are not limited to a digital multifunction peripheral of this type and may include other image forming apparatuses such as an image forming apparatus having only an image printing function and an image forming apparatus having only an image printing function and an image reading function.

The image forming apparatuses 90A, 90B, . . . do not necessarily have the same specification and differ in a service that can be performed, an item that can be configured for the service, or an installed optional component.

The server 80 and the multiple image forming apparatuses 90 are connected to each other by using a network N, and the server 80 is able to communicate with each of the multiple image forming apparatuses 90 via the network N. In the present exemplary embodiment, a public communication network such as the Internet or a telephone network is used as the network N, but this selection is made by way of illustration and not by way of limitation. For example, an intra-company communication network such as a local area network (LAN) or a wide area network (WAN) may be adopted as the network N, or such an intra-company communication network and a public communication network may be combined and adopted as the network N. In the present exemplary embodiment, a wireline communication network is adopted as the network N by way of non-limiting example, but a wireless communication network or a combination of wireline and wireless communication networks may be adopted.

As depicted in FIG. 1, the server 80 according to the present exemplary embodiment includes a storage unit 82 that stores a virtual-printer control information database 82A. The storage unit 82 is formed by a device such as a hard disk drive (HDD), a solid state drive (SSD), or a flash memory. The virtual-printer control information database 82A will be described in detail below.

An image forming apparatus 90 according to the present exemplary embodiment includes a display 92 and a storage unit 94, and the storage unit 94 stores an identifier 94A, which is apparatus identification information for identifying the image forming apparatus 90.

As described above, the information processing system 1 according to the present exemplary embodiment is configured to provide a cloud-based printing service, and when the cloud-based printing service is used, a virtual printer is created on the server 80 for each image forming apparatus 90. In addition, when the cloud-based printing service is used, each image forming apparatus 90 is assigned an identifier generally referred to as a universally unique identifier (UUID). Thus, in the information processing system 1 according to the present exemplary embodiment, this identifier is adopted as apparatus identification information for individually identifying each image forming apparatus 90.

As depicted in FIG. 1, the information processing system 1 according to the present exemplary embodiment includes an information processing apparatus 10 formed by a mobile terminal carried by a user of the cloud-based printing service. In the present exemplary embodiment, a smartphone is adopted as the information processing apparatus 10, but this selection is made by way of illustration and not by way of limitation. For example, a portable device of a different type, such as a cellular phone, a notebook personal computer, or a personal digital assistant may be adopted as the information processing apparatus 10.

Figure 2:
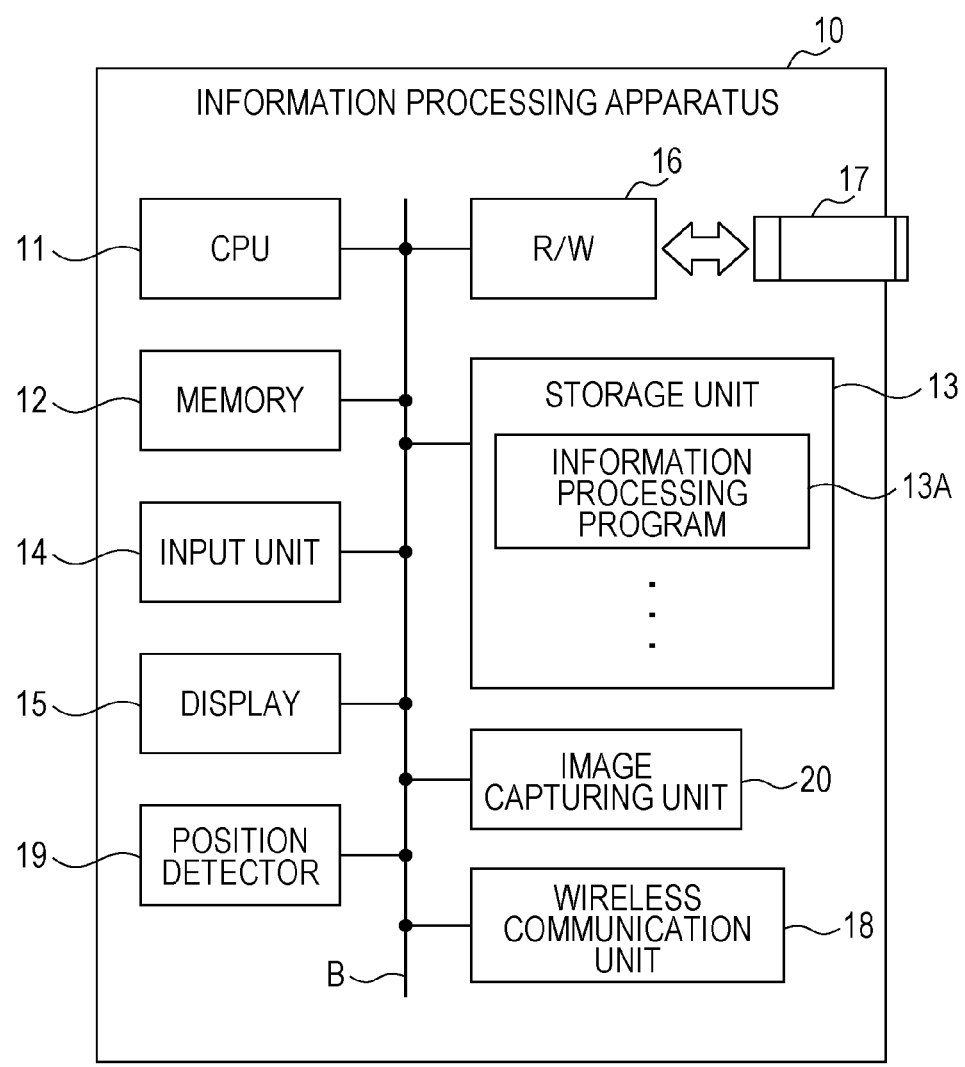
FIG. 2 is a block diagram depicting an example of a hardware configuration of an information processing apparatus according to the exemplary embodiments.
Figure 3:
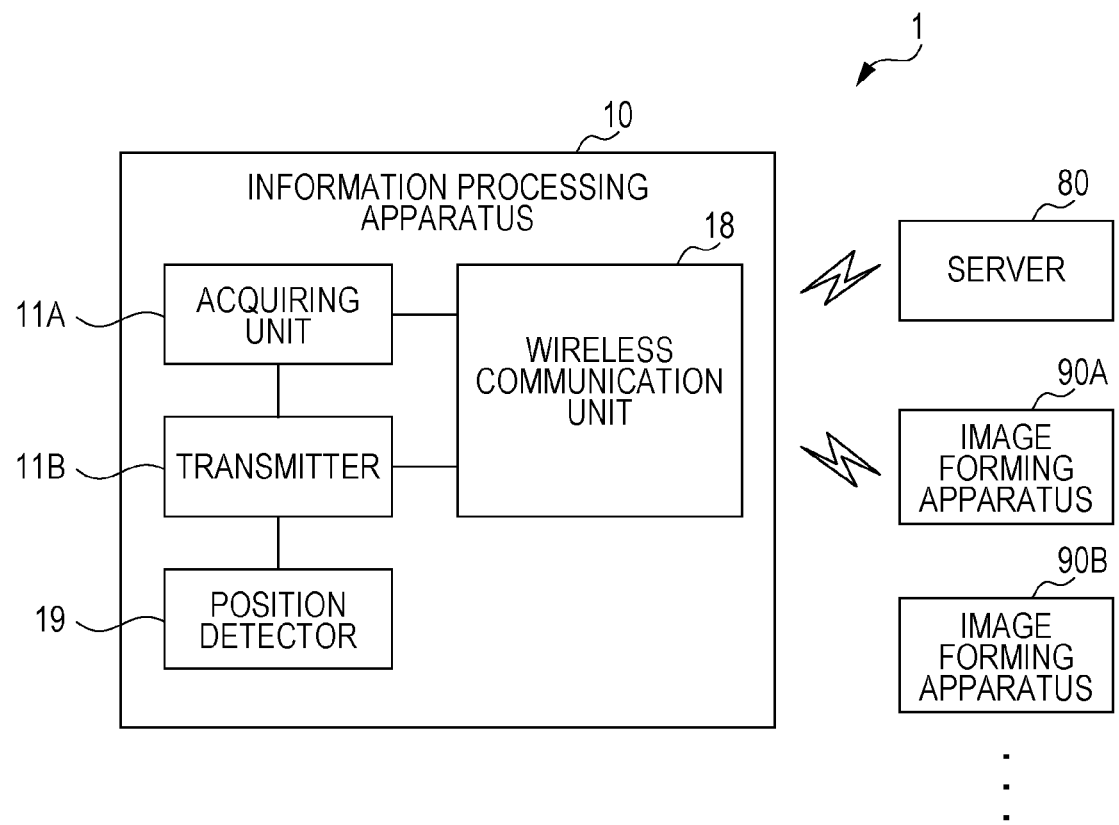
FIG. 3 is a block diagram depicting an example of a functional configuration of the information processing apparatus according to the exemplary embodiments.

Next, referring to FIGS. 2 and 3, a configuration of the information processing apparatus 10 according to the present exemplary embodiment will be described. FIG. 2 is a block diagram depicting an example of a hardware configuration of the information processing apparatus 10 according to the present exemplary embodiment, and FIG. 3 is a block diagram depicting an example of a functional configuration of the information processing apparatus 10 according to the present exemplary embodiment.

As depicted in FIG. 2, the information processing apparatus 10 according to the present exemplary embodiment includes a central processing unit (CPU) 11 as a processor, a memory 12 as a temporary storage region, a non-volatile storage unit 13, an input unit 14 such as a touch panel, a display 15 such as a liquid crystal display, a media reader/writer (R/W) 16, and a wireless communication unit 18. The information processing apparatus 10 according to the present exemplary embodiment also includes a position detector 19 and an image capturing unit 20. The CPU 11, the memory 12, the storage unit 13, the input unit 14, the display 15, the media reader/writer 16, the wireless communication unit 18, the position detector 19, and the image capturing unit 20 are connected to each other by using a bus B. The media reader/writer 16 reads information stored in a recording medium 17 and writes information into the recording medium 17.

The storage unit 13 according to the present exemplary embodiment is formed by a device such as an HDD, an SSD, or a flash memory. The storage unit 13 as a storage medium stores an information processing program 13A. The recording medium 17 into which the information processing program 13A has been written is connected to the media reader/writer 16, and the media reader/writer 16 reads the information processing program 13A in the recording medium 17. The information processing program 13A is saved to the storage unit 13 in this way. The CPU 11 sequentially executes processes included in the information processing program 13A by reading the information processing program 13A in the storage unit 13 and loading the program onto the memory 12.

The wireless communication unit 18 according to the present exemplary embodiment is able to communicate wirelessly with the server 80 via the network N. The wireless communication unit 18 according to the present exemplary embodiment is configured to communicate with the server 80 based on a communication standard such as what is called the fourth generation (4G) or the fifth generation (5G) mobile communication standard, but the communication may obviously be based on other communication standards.

In addition, the wireless communication unit 18 according to the present exemplary embodiment is also able to communicate directly with an image forming apparatus 90 via wireless communication. Accordingly, an image forming apparatus 90 has a built-in wireless communication unit (not depicted) able to communicate wirelessly with the wireless communication unit 18 of the information processing apparatus 10. The wireless communication unit 18 according to the present exemplary embodiment communicates with an image forming apparatus 90 based on a communication standard according to Bluetooth Low Energy (BLE), but the communication may be based on other communication standards. In addition to the standard according to BLE, any communication standard, such as Wi-Fi (registered trademark) or near field communication (NFC), can be used for the communication with an image forming apparatus 90 as long as short-range wireless communication with the image forming apparatus 90 is possible.

Further, the position detector 19 according to the present exemplary embodiment is configured to detect the position of the information processing apparatus 10 and output positional information. In the present exemplary embodiment, technology based on global positioning systems (GPS) is used, but this selection is made by way of illustration and not by way of limitation. The position detector 19 may be based on techniques such as position detection using positional information acquired from a Wi-Fi (registered trademark) router, position detection by using a beacon, and position detection through an image analysis using a captured image.

Further, the image capturing unit 20 according to the present exemplary embodiment is configured to capture a moving image or a static image and output image information obtained by the capture.

The information processing apparatus 10 obviously includes one or more other components (not depicted) for providing a function as a smartphone, such as a microphone for capturing a sound uttered by a user.

Next, referring to FIG. 3, a functional configuration of the information processing apparatus 10 according to the present exemplary embodiment will be described. As depicted in FIG. 3, the information processing apparatus 10 includes an acquiring unit 11A and a transmitter 11B. The CPU 11 of the information processing apparatus 10 is configured to function as the acquiring unit 11A and the transmitter 11B by executing the information processing program 13A.

The acquiring unit 11A according to the present exemplary embodiment is configured to acquire the identifier of an image forming apparatus 90 located within a predetermined distance. In the present exemplary embodiment, an image forming apparatus 90 is configured to always transmit, by BLE advertisement transmission, a signal representing the identifier assigned to the image forming apparatus 90. The acquiring unit 11A according to the present exemplary embodiment is configured to acquire the identifier, which is transmitted from the image forming apparatus 90 and received by the wireless communication unit 18.

In the information processing system 1 according to the present exemplary embodiment, the largest distance at which an identifier transmitted from an image forming apparatus 90 by BLE advertisement transmission can be received is set at a predetermined short distance (3 m in the present exemplary embodiment) from the image forming apparatus 90.

Accordingly, if the information processing apparatus 10 can receive an identifier, it can be determined that the image forming apparatus 90 corresponding to the received identifier is disposed within the short distance from the information processing apparatus 10.

The transmitter 11B according to the present exemplary embodiment is configured to transmit to a predetermined destination for the cloud-based printing service the identifier acquired by the acquiring unit 11A and positional information indicating the position of the information processing apparatus 10 after associating the positional information with the identifier.

In the present exemplary embodiment, the manager of the cloud-based printing service is adopted as the predetermined destination, but this selection is made by way of illustration and not by way of limitation. For example, the server 80 may be adopted as the predetermined destination in a mode of operation, and the identifier and the positional information may directly be saved to the virtual-printer control information database 82A without passing through the manager. When incorrect information has been transmitted in this mode of operation, it is sometimes hoped that a user who has sent the information is traced or checked. In such a case, information for identifying a user who has sent the identifier and the positional information may be transmitted to at least one of the manager of the cloud-based printing service and the server 80 and saved.

In the present exemplary embodiment, a combination of the latitude, the longitude, and the height that are obtained by the position detector 19 represents the positional information, but this combination is selected by way of illustration and not by way of limitation. For example, the positional information may be represented by a combination of only the latitude and the longitude that are obtained by the position detector 19. Alternatively, for example, the positional information may be represented by a name that enables the identification of the location of the image forming apparatus 90 whose identifier has been acquired by the acquiring unit 11A. Examples of a name that enables the identification of the location and that represents the positional information include the name of a building, the name of a room, an address, and the name of a piece of land. In an example of a mode of operation in which such names represent positional information, a user is prompted to enter a name by using a screen such as a user interface screen when transmitting positional information.

It is assumed that the transmitter 11B according to the present exemplary embodiment transmits an identifier and positional information to the predetermined destination only when approval from a user is obtained, but this assumption is provided by way of illustration and not by way of limitation. For example, an identifier and positional information may be transmitted to the predetermined destination without obtaining approval from a user.

Next, referring to FIG. 4, the virtual-printer control information database 82A according to the present exemplary embodiment will be described. FIG. 4 is a schematic illustration depicting an example of a configuration of the virtual-printer control information database 82A according to the present exemplary embodiment.

The virtual-printer control information database 82A according to the present exemplary embodiment is a database in which information regarding a virtual printer described above is registered, and pieces of information each corresponding to an item "printer name", an item "identifier", or an item "position" are associated with each other and stored as in the example depicted in FIG. 4.

The item "printer name" is provided to identify an image forming apparatus 90 corresponding to a virtual printer and represents a piece of information indicating the name assigned to the image forming apparatus 90. The item "identifier" represents a piece of information indicating the identifier assigned to the image forming apparatus 90 corresponding to the virtual printer, and the item "position" represents the positional information indicating the position at which the image forming apparatus 90 corresponding to the virtual printer is disposed.

The cloud-based printing service according to the present exemplary embodiment enables geographically distributed image forming apparatuses 90 to be managed on the cloud. In this operation, a manager need not be assigned to each location where an image forming apparatus 90 is disposed, and various settings on each image forming apparatus 90 are remotely configured.

Consequently, when causing the server 80 to create a virtual printer for an image forming apparatus 90 remotely located, the manager of the cloud-based printing service is not able to register positional information in the virtual-printer control information database 82A because accurate positional information of the location of the image forming apparatus 90 is not known.

Accordingly, when the manager creates a virtual printer for an image forming apparatus 90, the positional information of the image forming apparatus 90 corresponding to the virtual printer remains unregistered in the virtual-printer control information database 82A (the state of the printer D in the example depicted in FIG. 4).

Thus, as described above, in the information processing system 1 according to the present exemplary embodiment, the identifier of an image forming apparatus 90 located within the predetermined distance (3 m in the present exemplary embodiment) is acquired by using the information processing apparatus 10 carried by a user of the cloud-based printing service. Then, the information processing apparatus 10 transmits to the manager of the cloud-based printing service the identifier that has been acquired and positional information indicating the position of the information processing apparatus 10 after associating the positional information with the identifier. Upon receiving the identifier and the positional information, the manager checks the condition such as the eligibility of each piece of received information. Then, only when no problem is found, the manager registers the received positional information in the virtual-printer control information database 82A as the positional information corresponding to the received identifier.

Figure 5:
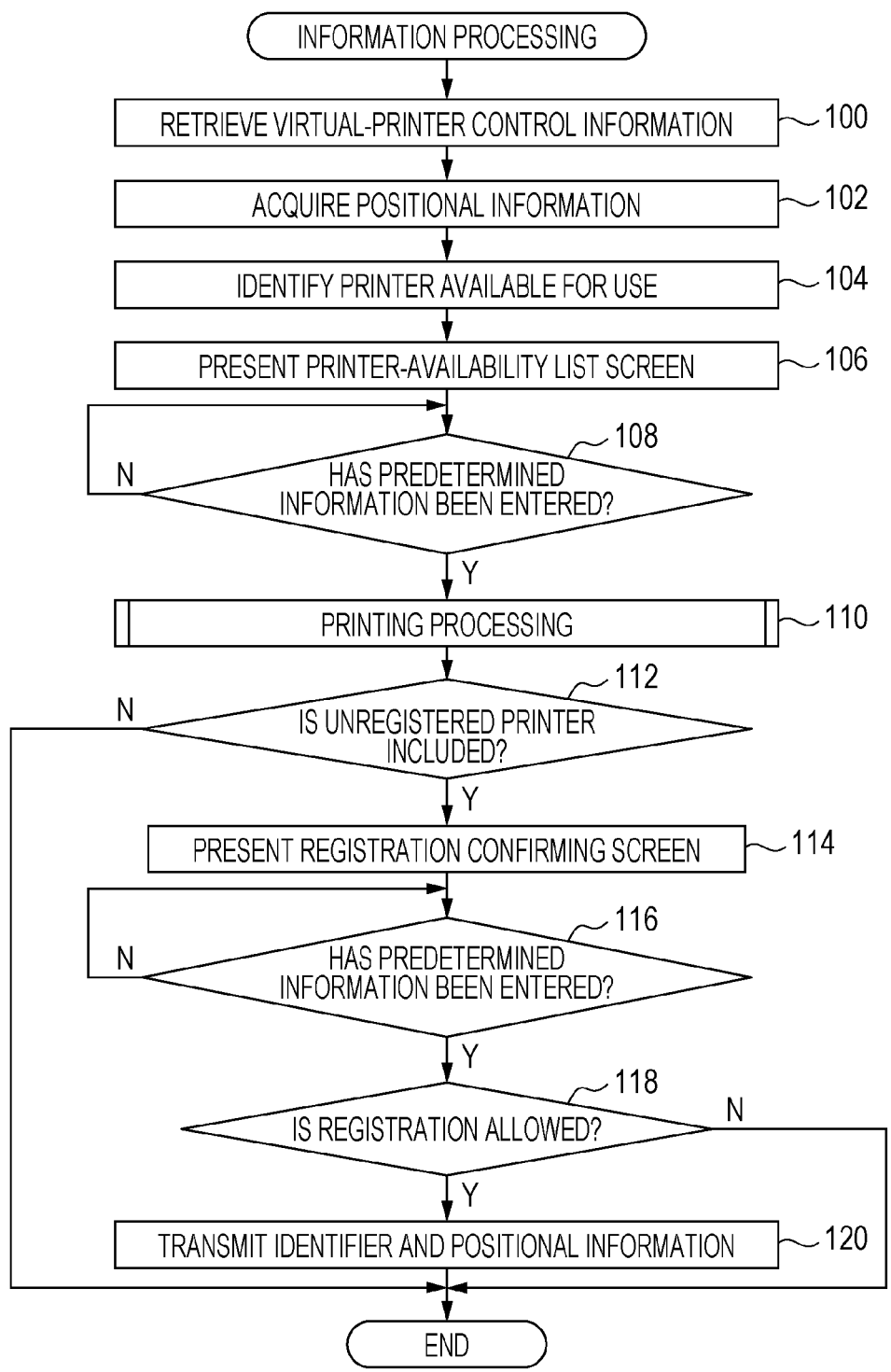
FIG. 5 is a flowchart depicting an example of information processing according to a first exemplary embodiment.

Next, referring to FIG. 5, description will be given with regard to an operation of the information processing apparatus 10 as an operation of the information processing system 1 according to the present exemplary embodiment. The information processing apparatus 10 serves a central role in the information processing system 1. FIG. 5 is a flowchart depicting an example of information processing according to the present exemplary embodiment.

In the present exemplary embodiment, as described above, the manager of the cloud-based printing service causes the server 80 to create virtual printers for geographically distributed image forming apparatuses 90. Through this operation, the name and the identifier of the image forming apparatus 90 corresponding to a created virtual printer is registered in the virtual-printer control information database 82A, and the identifier is saved in the storage unit 94 of the image forming apparatus 90.

Under this condition, when a user of the cloud-based printing service, who is to use the cloud-based printing service, provides the input unit 14 with an instruction for starting to execute the information processing program 13A, the CPU 11 of the information processing apparatus 10 executes the information processing program 13A, and the information processing depicted in FIG. 5 is performed.

In step 100 in FIG. 5, the CPU 11 retrieves all information (hereinafter, referred to as "virtual-printer control information") in the virtual-printer control information database 82A via the network N. In step 102, the CPU 11 acquires positional information from the position detector 19.

In step 104, the CPU 11 identifies an image forming apparatus 90 as a printer available for use if the positional information of the image forming apparatus 90 indicates that the image forming apparatus 90 is located within a predetermined maximum distance for use (10 m in the present exemplary embodiment) from the position indicated by the acquired positional information, that is, the position of the information processing apparatus 10.

In the present exemplary embodiment, the manager of the cloud-based printing service determines in advance a distance within which confidentiality of printed material can be maintained, and the distance determined in this way is adopted as the maximum distance for use. While confidentiality of printed material can be enhanced as the maximum distance for use decreases, the number of image forming apparatuses 90 available to a user decreases, leading to a decrease in convenience. Thus, the maximum distance for use may be determined as appropriate in accordance with a situation such as the condition in which an image forming apparatus 90 is disposed. For example, if an image forming apparatus 90 is disposed in an office of a company to which a user who is going to use the image forming apparatus 90 belongs, a relatively long distance may be set as the maximum distance for use for the sake of convenience. In contrast, if an image forming apparatus 90 is disposed in a public space inside one of multiple stores located at various places, such as a convenience store, a short distance around 1 to 2 m may be set as the maximum distance for use in consideration of confidentiality.

In addition, in step 104, if the CPU 11 receives an identifier from an image forming apparatus 90 and the positional information corresponding to the identifier is not registered in the virtual-printer control information, the CPU 11 also identifies the image forming apparatus 90 as a printer available for use. In the following description, the image forming apparatus 90 thus identified is referred to as an "unregistered printer".

In step 106, the CPU 11 causes the display 15 to present a printer-availability list screen, which has a predetermined configuration, by using pieces of virtual-printer control information corresponding to one or more printers available for use that have been identified. In step 108, the CPU 11 waits for predetermined information to be entered. FIG. 6 depicts an example of the printer-availability list screen according to the present exemplary embodiment.

As depicted in FIG. 6, a message prompting a user to specify an image forming apparatus 90 to be used is presented in the printer-availability list screen according to the present exemplary embodiment. In the printer-availability list screen according to the present exemplary embodiment, pieces of virtual-printer control information regarding printers available for use are presented in increasing order of distance from the position obtained by the position detector 19. Accordingly, the user is able to find image forming apparatuses 90 available to the user in order of closeness to the user by referring to the printer-availability list screen.

In the printer-availability list screen, the user uses the input unit 14 to specify an image forming apparatus 90 that the user wants to use and further selects an "End" button 15A. When the user selects the "End" button 15A, an affirmative determination is made in step 108, and the process proceeds to step 110.

In step 110, the CPU 11 performs printing processing by using the virtual printer corresponding to the image forming apparatus 90 specified by the user. The printing processing is known in the art, and detailed description will not be given herein.

In step 112, the CPU 11 determines whether the printers available for use include an unregistered printer. If a negative determination is made, the information processing is finished, and if an affirmative determination is made, the process proceeds to step 114.

In step 114, the CPU 11 causes the display 15 to present a registration confirming screen, which has a predetermined configuration. In step 116, the CPU 11 waits for predetermined information to be entered. FIG. 7 depicts an example of the registration confirming screen according to the present exemplary embodiment.

As depicted in FIG. 7, the registration confirming screen according to the present exemplary embodiment presents a message prompting the user to specify whether to register the position of an unregistered printer in the virtual-printer control information database 82A. The registration confirming screen according to the present exemplary embodiment also presents a "Register" button 15B, which is to be selected when the position of an unregistered printer is allowed to be registered in the virtual-printer control information database 82A, and a "Do not register" button 15C, which is to be selected when the position of an unregistered printer is not allowed to be registered.

Accordingly, the user selects the "Register" button 15B when allowing the positional information to be registered in the virtual-printer control information database 82A and selects the "Do not register" button 15C when not allowing the positional information to be registered, the positional information indicating the position identified by the position detector 19 of the information processing apparatus 10 carried by the user. When the user selects the "Register" button 15B or the "Do not register" button 15C, an affirmative determination is made in step 116, and the process proceeds to step 118.

In step 118, the CPU 11 determines whether the user has allowed the positional information to be registered by determining whether the user has selected the "Register" button 15B. If a negative determination is made in step 118, the information processing is finished, and if an affirmative determination is made, the process proceeds to step 120.

In step 120, the CPU 11 transmits via the wireless communication unit 18 the identifier received from the unregistered printer and the positional information acquired at this point from the position detector 19 to an information processing apparatus (not depicted), which is owned by the manager of the cloud-based printing service, and thereafter finishes the information processing. As described above, the manager of the cloud-based printing service checks the condition such as the eligibility of each piece of received information. Then, only when no problem is found, the manager registers the received positional information in the virtual-printer control information database 82A as the positional information corresponding to the received identifier.

Second Exemplary Embodiment

Since an overall configuration of an information processing system 1 according to a second exemplary embodiment is the same as or similar to that of the information processing system 1 according to the first exemplary embodiment and hardware and functional configurations of an information processing apparatus 10 according to the second exemplary embodiment are the same as or similar to those of the information processing apparatus 10 according to the first exemplary embodiment, those configurations will not repeatedly be described herein.

Figure 8:
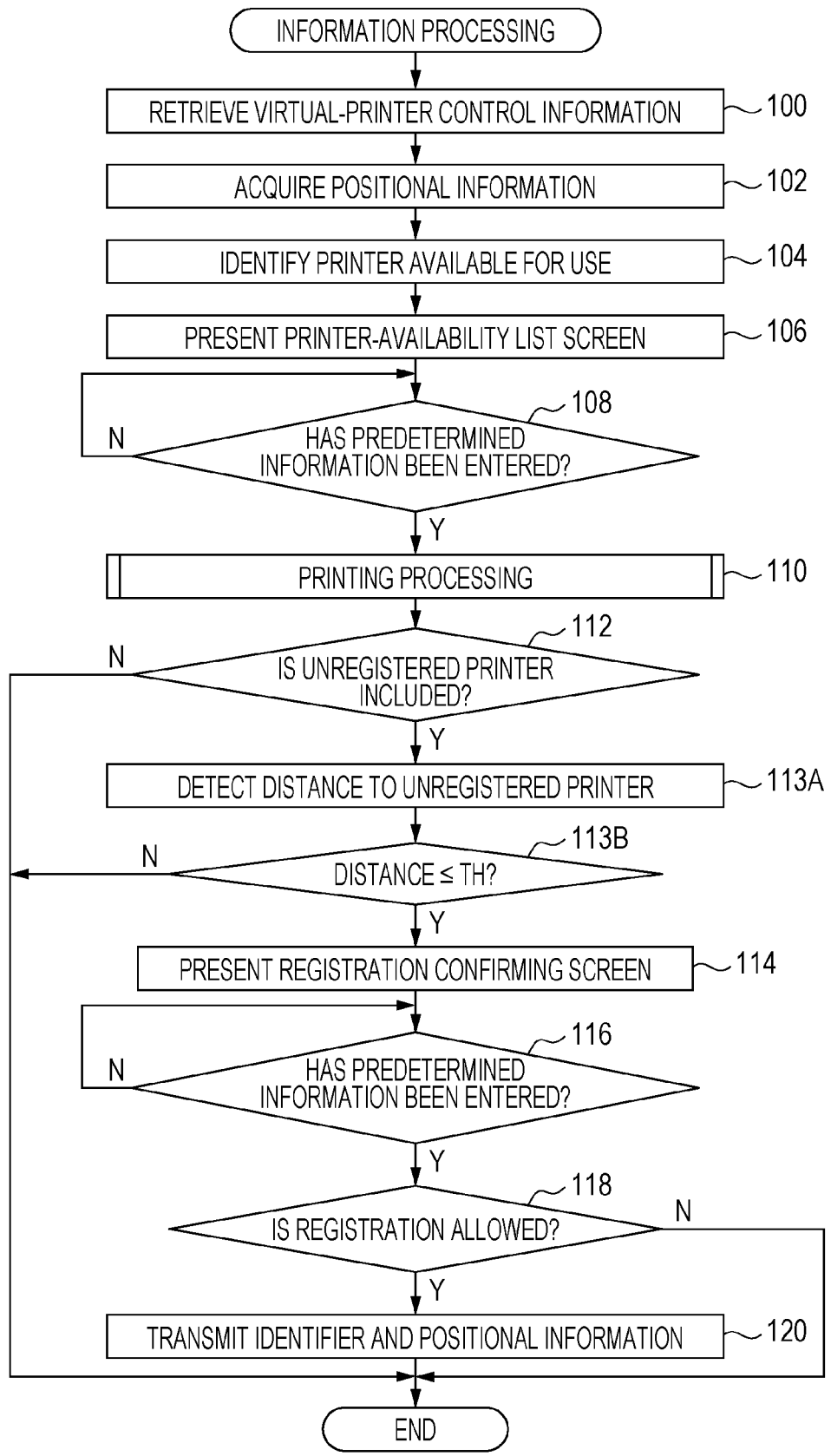
FIG. 8 is a flowchart depicting an example of information processing according to a second exemplary embodiment.

Hereinafter, referring to FIG. 8, description will be given with regard to an operation of the information processing apparatus 10 as an operation of the information processing system 1 according to the present exemplary embodiment. FIG. 8 is a flowchart depicting an example of information processing according to the present exemplary embodiment. A step in FIG. 8 for performing the same process as in FIG. 5 is denoted by the same numeral as in FIG. 5, and description regarding such a step will be omitted.

As depicted in FIG. 8, the information processing according to the present exemplary embodiment differs from the information processing according to the first exemplary embodiment in that processing in steps 113A and 113B is inserted between steps 112 and 114.

Specifically, in step 113A, the CPU 11 detects a distance to an unregistered printer. In the present exemplary embodiment, the distance to an unregistered printer is detected based on the intensity of an electromagnetic wave that is received from the unregistered printer and that transports the identifier of the unregistered printer. A technique for detecting a distance based on the intensity of an electromagnetic wave of a received signal is described in literature such as https://ednjapan.com/edn/articles/2001/23/news011_2.html, and further description will be omitted.

Then, in step 113B, the CPU 11 determines whether the detected distance is equal to or shorter than a predetermined threshold TH (1 m in the present exemplary embodiment). If an affirmative determination is made in step 113B, the process proceeds to step 114, and if a negative determination is made in step 113B, the information processing is finished.

In other words, in the information processing according to the present exemplary embodiment, the positional information of an unregistered printer is allowed to be registered only when the distance to the unregistered printer is equal to or shorter than the threshold TH. In this way, positional information indicating a more accurate position can be registered as the threshold TH is set to a shorter distance.

In communication using BLE advertisement transmission, an identifier is sometimes detected at a distance that is longer than expected. Further, a user sometimes moves from a position at which an identifier of an image forming apparatus 90 was detected using BLE advertisement transmission to another position that is farther away from the image forming apparatus 90, and the user provides an instruction for the registration of the positional information at the other position.

Thus, in the second exemplary embodiment, if the detected distance is longer than the threshold TH, the user may be urged to move closer to the unregistered printer, and the registration of the positional information may be allowed when the detected distance becomes equal to or shorter than the threshold TH.

In the exemplary embodiments, description has been given with regard to the cases where an identifier of an image forming apparatus 90 is acquired by short-range wireless communication using BLE, but the way to acquire an identifier described above is presented by way of illustration and not by way of limitation. For example, an identifier presentation screen depicted in FIG. 9 as an example may be presented on the display 92 of an image forming apparatus 90 in response to an instruction from a user, and an identifier may be acquired by using this identifier presentation screen.

As depicted in FIG. 9, an identifier is presented in this identifier presentation screen in two formats, one being a character string and the other being a two-dimensional code. Accordingly, the user refers to the identifier presentation screen and acquires the identifier either by entering the presented character string into the information processing apparatus 10 owned by the user by using the input unit 14 or by capturing the image of the two-dimensional code by using the image capturing unit 20.

Examples of the method to acquire an identifier are not limited to the method using the short-range wireless communication and the method using the identifier presentation screen and may include a method in which an identifier is acquired by bringing the information processing apparatus 10 into contact with an image forming apparatus 90. In short, any method is applicable as long as an identifier can be acquired from a target image forming apparatus 90 closely located. Examples of the method in which an identifier is acquired by bringing the information processing apparatus 10 into contact with an image forming apparatus 90 include a technique based on the near field communication (NFC) standard.

In the above exemplary embodiments, description has been given with regard to the cases where positional information is registered at the time when a user uses the cloud-based printing service, but these cases are presented by way of illustration and not by way of limitation. For example, positional information may be registered when a user moves close to an image forming apparatus 90 whose identifier has not been registered in the virtual-printer control information database 82A and the information processing apparatus 10 receives the identifier from the image forming apparatus 90. Examples of the information processing in such a case include only the processes in the steps starting from step 114 in the example depicted in FIG. 5.

In the above exemplary embodiments, description has been given with regard to the cases where the information processing apparatus 10 directly transmits an identifier and positional information to the manager of the cloud-based printing service or the server 80, but these cases are presented by way of illustration and not by way of limitation. For example, an identifier and positional information may be transmitted to the manager of the cloud-based printing service or the server 80 via the image forming apparatus 90 corresponding to the identifier and the positional information.

In the above exemplary embodiments, description has been given with regard to the cases where the present disclosure is applied to a cloud-based printing service, but these cases are presented by way of illustration and not by way of limitation. For example, the present disclosure may be applied to a printing service that does not use a cloud server, such as a printing service using an apparatus such as a network server in an organization.

In the above exemplary embodiments, description has been given with regard to the cases where the virtual-printer control information database 82A is registered in the server 80, but these cases are presented by way of illustration and not by way of limitation. For example, the virtual-printer control information database 82A may be registered in an image forming apparatus 90 or a different apparatus that can be accessed by an image forming apparatus 90.

The exemplary embodiments have been described as above, but the technical scope of the present disclosure is not limited to the range described in the above exemplary embodiments. Various modifications and improvements to the above exemplary embodiments are possible without departing from the spirit of the present disclosure, and embodiments incorporating such modifications or improvements are also within the technical scope of the present disclosure.

The above exemplary embodiments are not intended to limit the disclosure defined by the claims, and not all of the combinations of features described in the exemplary embodiments are necessary to constitute a solution in the disclosure. The exemplary embodiments described above include solutions in various stages, and various solutions are extracted in accordance with combinations of a plurality of disclosed elements. If some elements of all the elements described in the exemplary embodiments are removed, a configuration with these elements removed can be extracted as a solution as long as an effect is obtained.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiments, description has been given with regard to the cases where the information processing is performed based on a software configuration in which a computer executes a program, but the present disclosure is not limited to these cases. The information processing may be performed, for example, based on a hardware configuration or a combination of a hardware configuration and a software configuration.

In addition, the configuration of the information processing apparatus 10 described in the above exemplary embodiments is intended to be illustrative, and obviously an unnecessary component may be removed or a new component may be added without departing from the spirit of the present disclosure.

The process flows of the information processing described in the above exemplary embodiments are also intended to be illustrative. Obviously, an unnecessary step may be removed, a new step may be added, or the process order may be changed without departing from the spirit of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
retrieve virtual-printer control information that records information regarding a plurality of virtual printers from a server for a printing service, wherein the plurality of virtual printers are created on and controlled by the server, wherein the plurality of virtual printers respectively correspond to a plurality of physical image forming apparatuses connected to the server by using a network;
acquire apparatus identification information of a target image forming apparatus located within a predetermined distance from the information processing apparatus;
acquire positional information indicating a position of the information processing apparatus after associating the positional information with the apparatus identification information;
determine whether position information of a virtual printer corresponding to the target image forming apparatus is registered according to the virtual-printer control information and the apparatus identification information; and
transmit the apparatus identification information of the target image forming apparatus and the positional information of the information processing apparatus to the server for the printing service in response to the position information of the virtual printer corresponding to the target image forming apparatus being unregistered,
wherein the server registers the positional information received from the information processing apparatus as positional information of the virtual printer corresponding to the target image forming apparatus according to the apparatus identification information in the virtual-printer control information.

2. The information processing apparatus according to claim 1,
wherein the predetermined destination is at least one of a manager of the printing service and the server.

3. The information processing apparatus according to claim 2,
wherein the processor is configured to acquire the apparatus identification information from the target image forming apparatus via wireless communication.

4. The information processing apparatus according to claim 3,
wherein the processor is configured to acquire the apparatus identification information from the target image forming apparatus via short-range wireless communication.

5. The information processing apparatus according to claim 2,
wherein the processor is configured to acquire the apparatus identification information by using contact between the target image forming apparatus and the information processing apparatus or by using entry by a user.

6. The information processing apparatus according to claim 5,
wherein the entry by the user is capturing an image of information that represents the apparatus identification information and that is presented by a display included in the target image forming apparatus.

7. The information processing apparatus according to claim 2,
wherein the positional information is at least one of three pieces of information referred to as a first piece of information, a second piece of information, and a third piece of information, the first piece of information is formed by a combination of latitude and longitude, the second piece of information is formed by a combination of latitude, longitude, and height, and the third piece of information represents a name by which a location of the target image forming apparatus can be identified.

8. The information processing apparatus according to claim 1,
wherein the processor is configured to acquire the apparatus identification information from the target image forming apparatus via wireless communication.

9. The information processing apparatus according to claim 8,
wherein the processor is configured to acquire the apparatus identification information from the target image forming apparatus via short-range wireless communication.

10. The information processing apparatus according to claim 9,
wherein the short-range wireless communication is communication using Bluetooth Low Energy (BLE).

11. The information processing apparatus according to claim 1,
wherein the processor is configured to acquire the apparatus identification information by using contact between the target image forming apparatus and the information processing apparatus or by using entry by a user.

12. The information processing apparatus according to claim 11,
wherein the entry by the user is capturing an image of information that represents the apparatus identification information and that is presented by a display included in the target image forming apparatus.

13. The information processing apparatus according to claim 12,
wherein the information that represents the apparatus identification information is a two-dimensional code.

14. The information processing apparatus according to claim 1,
wherein the positional information is at least one of three pieces of information referred to as a first piece of information, a second piece of information, and a third piece of information, the first piece of information is formed by a combination of latitude and longitude, the second piece of information is formed by a combination of latitude, longitude, and height, and the third piece of information represents a name by which a location of the target image forming apparatus can be identified.

15. The information processing apparatus according to claim 14,
wherein the processor is configured to acquire the positional information by using global positioning system (GPS) if the positional information is the first piece of information or the second piece of information.

16. The information processing apparatus according to claim 1,
wherein the processor is configured to transmit the apparatus identification information and the positional information to the predetermined destination only when approval from a user is obtained.

17. The information processing apparatus according to claim 1, wherein the processor is further configured to:
   display a registration confirming screen to prompt the user to specify whether to register the position information of the virtual printer corresponding to the target image forming apparatus; and
   prompt the user to acquire the apparatus identification information of the target image forming apparatus in response to a registration of the position information of the virtual printer corresponding to the target image forming apparatus being selected.

18. The information processing apparatus according to claim 1, wherein the processor is further configured to:
   prompt the user to acquire an identifier, as the apparatus identification information of the target image forming apparatus, from the target image forming apparatus by bringing the information processing apparatus into contact with the target image forming apparatus.

19. A non-transitory computer readable medium storing a program causing a computer included in an information processing apparatus to execute a process for information processing, the process comprising:
   retrieve virtual-printer control information that records information regarding a plurality of virtual printers from a server for a printing service, wherein the plurality of virtual printers are created on and controlled by the server, wherein the plurality of virtual printers respectively correspond to a plurality of physical image forming apparatuses connected to the server by using a network;
   acquiring apparatus identification information of a target image forming apparatus located within a predetermined distance from the information processing apparatus;
   acquiring positional information indicating a position of the information processing apparatus after associating the positional information with the apparatus identification information;
   determining whether position information of a virtual printer corresponding to the target image forming apparatus is registered according to the virtual-printer control information and the apparatus identification information; and
   transmitting the apparatus identification information of the target image forming apparatus and the positional information of the information processing apparatus to the server for the printing service in response to the position information of the virtual printer corresponding to the target image forming apparatus being unregistered,
   wherein the server registers the positional information received from the information processing apparatus as positional information of the virtual printer corresponding to the target image forming apparatus according to the apparatus identification information in the virtual-printer control information.

20. An information processing method performed by using an information processing apparatus, the method comprising:
   retrieve virtual-printer control information that records information regarding a plurality of virtual printers from a server for a printing service, wherein the plurality of virtual printers are created on and controlled by the server, wherein the plurality of virtual printers respectively correspond to a plurality of physical image forming apparatuses connected to the server by using a network;
   acquiring apparatus identification information of a target image forming apparatus located within a predetermined distance from the information processing apparatus;
   acquiring positional information indicating a position of the information processing apparatus after associating the positional information with the apparatus identification information;
   determining whether position information of a virtual printer corresponding to the target image forming apparatus is registered according to the virtual-printer control information and the apparatus identification information; and
   transmitting the apparatus identification information of the target image forming apparatus and the positional information of the information processing apparatus to the server for the printing service in response to the position information of the virtual printer corresponding to the target image forming apparatus being unregistered,
   wherein the server registers the positional information received from the information processing apparatus as positional information of the virtual printer corresponding to the target image forming apparatus according to the apparatus identification information in the virtual-printer control information.

\* \* \* \* \*